Figure 1:
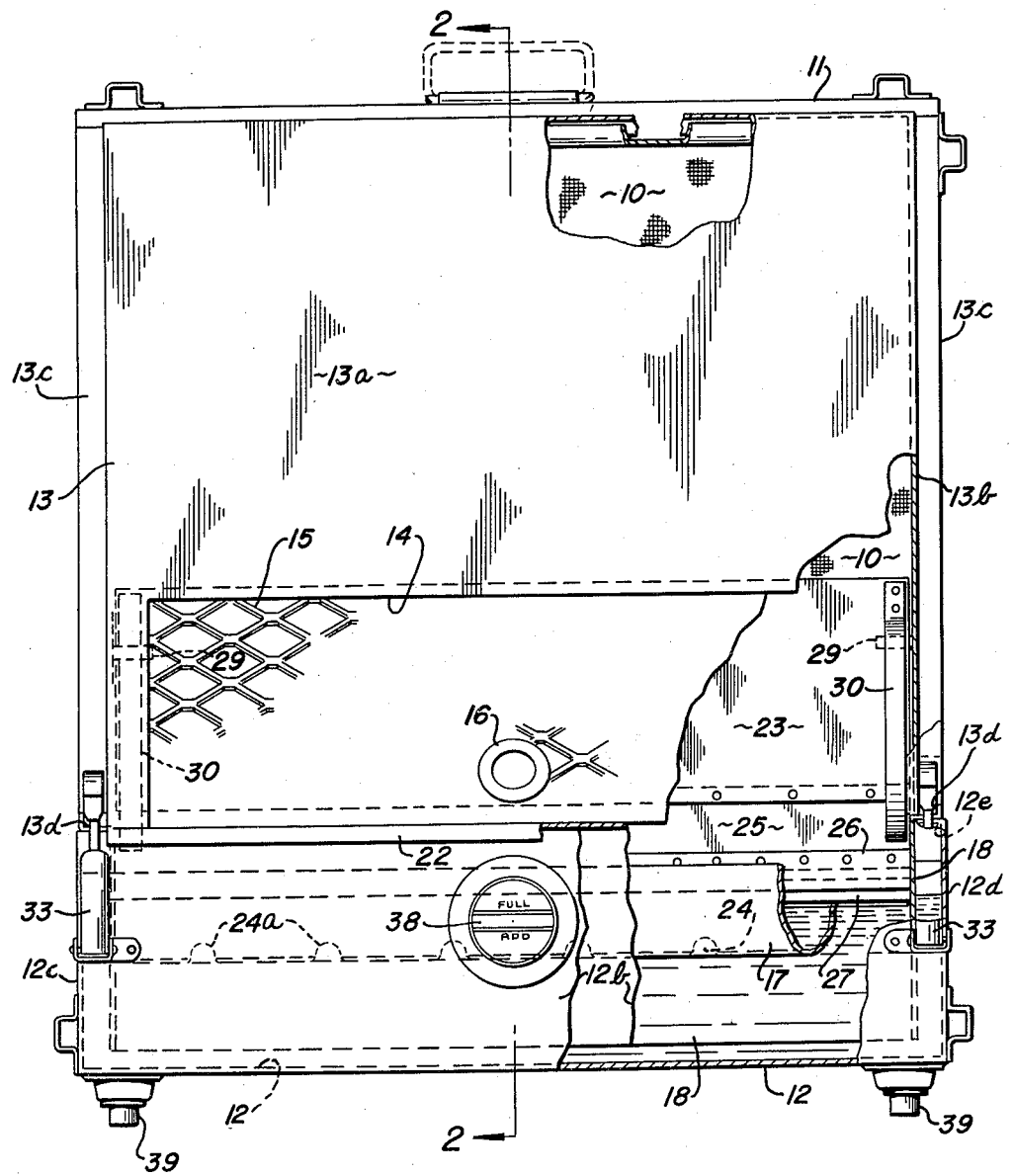

Jan. 1, 1963 G. M. WALTON 3,070,936
SELF-CLEANING FILTER
Filed March 30, 1959 2 Sheets-Sheet 1

INVENTOR.
GEORGE M. WALTON
BY
Hyde, Meyer, Baldwin & Doran
ATTORNEYS

Jan. 1, 1963 G. M. WALTON 3,070,936
SELF-CLEANING FILTER
Filed March 30, 1959 2 Sheets-Sheet 2
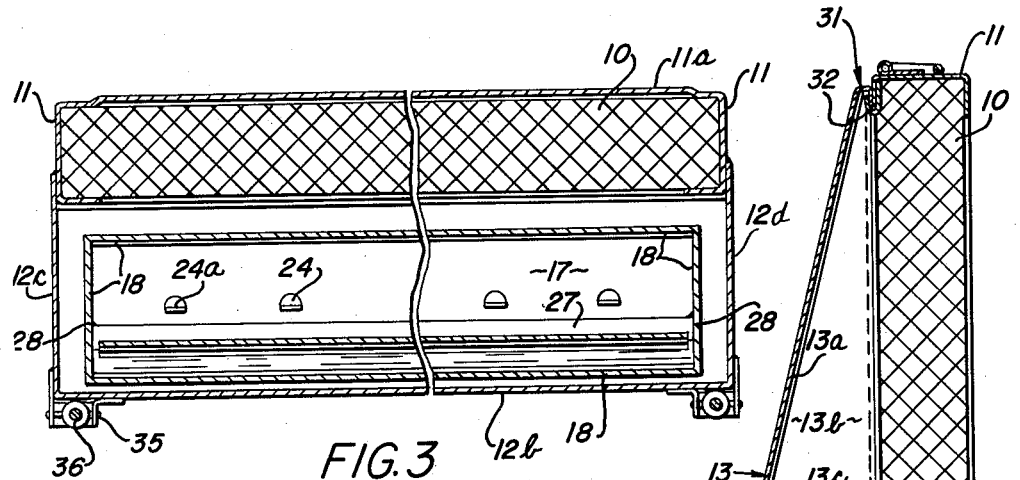
FIG. 3
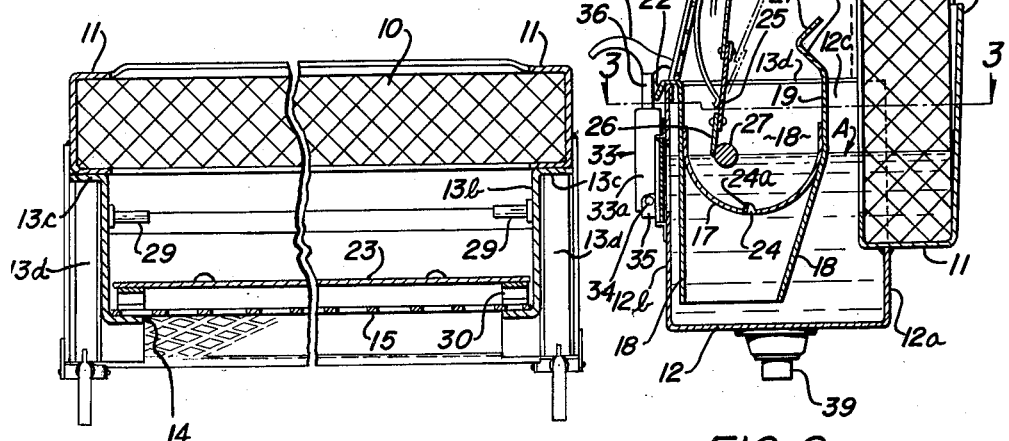
FIG. 4 FIG. 2
INVENTOR.
GEORGE M. WALTON
BY
ATTORNEYS 3,070,936
SELF-CLEANING FILTER
George M. Walton, Cleveland, Ohio, assignor, by mesne assignments, to Rockwell-Standard Corporation, Coraopolis, Pa., a corporation of Pennsylvania
Filed Mar. 30, 1959, Ser. No. 802,674
15 Claims. (Cl. 55—225)

This invention relates to improvements in a self-cleaning panel filter.

One of the objects of the present invention is to provide a filter media panel having a generally planar and generally vertical inlet face for an entering gaseous stream to be filtered, together with frame means about the panel limiting the entering stream flow substantially to the inlet face thereof, together with a liquid bath reservoir in front of and adjacent the lower portion of the panel, with a housing or frame upstream from the panel having a stream inlet opening providing the only inlet for the gaseous stream and located in the frame means or housing horizontally opposite the lower half of the panel face, and baffle means compelling substantially all of the stream flow from this inlet opening to pass through liquid in the reservoir at a lower stream velocity through the filter, and this baffle means being arranged so that when subjected to a higher stream velocity, it by-passes some of the inlet gaseous stream for direct flow through the panel. This provides a structure whereby the flowing gaseous stream carries liquid from the reservoir into the filter panel so as to wash off the dirt particles there and carry them back down into the reservoir, this process of washing being continuous.

The present invention also comprises refinements including special biasing means holding the baffle means substantially in sealing engagement with the upper edge of the air inlet opening in the housing at low stream flow but permitting a gaseous stream at higher velocity to open the baffle means against the bias normally holding it closed; also an oil control trough below the baffle means; also a manometer skirt substantially completely enclosing the space in the reservoir below the oil control trough, this skirt being open at the bottom only, and terminating a short distance above the bottom of the reservoir; also a novel means for returning the liquid from the filter panel back to the reservoir; and also a novel construction whereby the filter panel and the reservoir provides one unitary construction while a housing in front of the panel (including the gas inlet opening) and the baffle means, oil control trough and manometer skirt are part of another unitary construction easily assembled and disassembled with the panel and reservoir unit.

Other objects and advantages of my invention will be apparent from the accompanying drawings and description and the essential features thereof will be set forth in the appended claims.

In the drawings:

FIG. 1 is a front elevational view of a filter embodying my invention, parts being broken away to more clearly show the construction;

FIG. 2 is a transverse sectional view of the same taken along the line 2—2 of FIG. 1; while FIGS. 3 and 4 are sectional views taken along lines 3—3 and 4—4, respectively, of FIG. 2.

In the drawings, there is shown at 10 a filter panel filled with a filtering media which may be of any type filter capable of holding its form under repeated washings so that particles collected on the panel may be washed off and the panel continues to perform its function. This panel is preferably completely surrounded by a continuous channel shape 11 on all four sides thereof which closes the top, bottom and two parallel vertical sides of the panel while leaving the front and rear open for gaseous stream flow through the filter media. Preferably, this frame about the filter is bent slightly downstream as indicated at 11a in FIGS. 2 and 3 to provide a lip slightly outstanding from the rear face of the filter panel and extending entirely across the rear face thereof for a short distance up from the bottom so as to more readily catch any liquid which may fall off the rear face of the filter.

While the embodiment shown is a flat, planar, panel it should be understood that the invention can be used with a curved panel.

Preferably, rigidly connected to the frame 11 of the panel, as by welding, is a generally rectangular reservoir 12 which has a short rear wall 12a, a front wall 12b extending the full width of the filter and approximately the same width as the panel and end walls 12c and 12d which in turn connect the walls 12a and 12b and also provide a leakproof joint with the frame 11 of the filter panel up to the level of the top of the reservoir. Thus, the liquid in the reservoir which normally extends up to the level A under no-flow condition, may flow freely into the lower part of the filter panel frame as clearly indicated in FIG. 2.

The housing 13 encloses the space above the reservoir and in front of the panel 10. This housing has an inclined front wall 13a which slopes from the upper front edge of the reservoir wall 12b rearwardly and upwardly to the top of the filter panel. There are also two end walls 13b of this housing which are generally triangular in shape and which are provided with outwardly turned flanges 13c which seal against the panel frame 11 when the parts are in operative position as clearly shown in the various views of the drawing. At the bottom of each of the triangular sides 13b of this housing, there is a channel 13d welded to each side 13b and which extends outwardly at each triangular end of the housing 13 and lies flat against an inwardly turned horizontal flange 12e at the top of each of the reservoir walls 12c and 12d. This construction is seen best in FIG. 1.

In the front wall 13a of the housing 13, horizontally opposite the lower half of the face of the filter panel 10, is provided an inlet opening 14 which preferably extends for the greater part across the width of the panel 10 and preferably approximately down to the top of the reservoir 12. Preferably also, the opening 14 is provided with a coarse screening such as the expanded metal shown at 15 which may be welded in place to protect the complete face of the opening 14. Preferably, but not necessarily, an oil fill opening 16 comprises a grommet in the central lower portion of the grill 15 and provides an opening through which oil or other reservoir bath liquid may be introduced.

Preferably also, for a purpose later described, an oil control trough 17 and a manometer skirt 18 are provided integral or unitary with the housing 13. The manometer skirt 18 has generally vertical front and rear walls connected by two end walls as clearly shown in FIG. 3. The rear wall preferably slopes slightly forwardly and downwardly as indicated in FIG. 2. This manometer skirt ends a short distance above the bottom of the reservoir 12.

The rear wall of the manometer skirt extends above the normal liquid level A for a short distance as indicated at 19 generally parallel to the front face of the filter panel, then inclined forwardly at an angle of approximately 45 degrees to the vertical as indicated at 20, then reversely bent at 21 at approximately 90 degrees to the portion 20 so as to provide a lip extending upwardly and rearwardly toward the filter panel face. The front wall of the manometer skirt 18 extends vertically out of the liquid in the reservoir and then is bent horizontally forwardly and then downwardly as indicated at 22 to provide a lip extending across the entire front of the device to hook over the top wall 12b of the reservoir when the parts are assembled as shown in FIG. 2.

The oil control trough 17 is welded to the front and rear walls of the manometer skirt as clearly shown in FIG. 2. This control trough extends from a zone below the baffle means 23 and below the normal level of the liquid in the reservoir as indicated at A at no-flow condition and is thence inclined upwardly toward the panel 10. Preferably, the oil control trough is concave upwardly having the cross section of substantially a semicircle as clearly shown in FIG. 2. This trough extends the entire length of the manometer skirt and is preferably welded to the end walls of this skirt. In the bottom of the control trough are a small number of oil openings 24 preferably simply struck up from the metal of the trough providing a tongue 24a on the front side of each opening. For example, in a manometer skirt which is approximately 18 inches wide, there are five of these openings spaced at about three-inch intervals.

The baffle means 23 is provided for the purpose of compelling substantially all of the stream flow from the inlet opening 14 to pass through the liquid in the control trough 17 at lower stream velocity through the filter, and then to by-pass some of the stream flow independent of the liquid in the reservoir at higher stream velocities through the filter. To this end, the baffle means comprises a generally imperforate plate extending across the entire width and height of the opening 14 and adapted to take a position as shown in full lines in FIG. 2 where the top of the baffle plate is substantially in engagement with the upper edge of the opening 14 at 14a. This baffle plate in turn is rigidly connected to an imperforate strip of spring metal 25 which is the same width as the baffle means 23 and is part thereof and which in turn is rigidly connected to another plate of the same length as shown at 26 and welded to a rod or bar 27 which in turn is welded at 28 to the end walls of the manometer skirt 18. Thus, in the full line position of FIG. 2, the baffle means compels practically all of the gaseous stream entering through the opening 14 to pass downwardly in front of the baffle means, then through the liquid bath in the control trough 17 beneath the bar 27, and then out the other side and up toward the filter panel.

Means is provided biasing the baffle means 23 to the full line position shown in FIG. 2. This could be provided by a spring hinge, or by any pivoted baffle having spring means urging the same in the desired direction. However, I have provided this same biasing means utilizing the strip of spring metal 25 interposed between that portion of the baffle means which is fastened to the rod 27 and that portion which is opposite the opening 14. The construction is such that the spring metal 25 urges the baffle means to the closed position shown in full lines in FIG. 2 but it is of such strength that it only holds the baffle means in this position at the lower velocities of flow through the filter. I visualize this desirable closed condition of the baffle means as varying between ten and fifty percent of the full flow capacity of the filter. In one embodiment of my invention, designed for peak loads of 1750 cubic feet per minute or continuous loads of 1500 cubic feet per minute, the baffle means 23 is designed to start opening at 375 cubic feet per minute velocity flow. When higher volumes of air flow cause the baffle means 23 to move from the full line position to the dot-dash position of FIG. 2, the movement of the baffle means toward the filter panel is limited by means of two pins 29, each respectively extending inwardly from one of the side walls 13b of the front housing. In the dot-dash position of the baffle means 23 in FIG. 2, it will be noted that the free upper edge thereof is still spaced from the panel so that flow may occur of oil-bearing air or the like upwardly over the front face of the panel.

Preferably, but not necessarily, I provide means to prevent chattering of the baffle means 23 when it is in the full line position of FIG. 2 and a low flow of gas is passing through the filter. This comprises two leaf springs 30, one at each end of the baffle means 23 and extending generally in a vertical direction. The upper end of each spring is secured rigidly, as by rivets, to the baffle itself. The lower end of each spring is free and presses against the spring plate 25. Each spring 30 is bowed forwardly so as to be slightly compressed against the grill 15 under no-flow and low flow conditions as indicated in FIG. 2. In other words, the tension of the spring plate 25 is capable of overcoming the springs 30 in this position.

As mentioned previously, for ease in assembly and disassembly, I prefer to make the panel 10, its frame 11 and the reservoir 12 in a single unit. I then join the housing 13, the oil control trough 17, the manometer skirt 18 and the baffle means 23 in another unit. Referring to FIG. 2, it will be noted that the upper end of the housing 13 is provided with a flange extending across the entire width of the filter which extends inwardly and downwardly. To cooperate with this, a trough 32 extending outwardly and upwardly is attached to the upper portion of the frame 11.

When these two unitary constructions are placed together, the flange 31 enters downwardly into the trough 32 while at the same time the flanges 13b at the lower end of the housing 13 rest upon the flanges 12e of the reservoir and a hooklike portion 22, extending forwardly from the skirt 18, hooks over the front wall 12b of the reservoir. At this time the vertical flanges 13c at each side of the housing 13 press against the frame 11 of the filter panel. Additional sealing means may be provided at any of these surfaces if desired, although if the parts are well made there is insufficient leakage at these points to seriously interfere with the operation of the filter. The two unitary parts of the device are then clamped together by means of two clamps 33, one being placed at each side of the filter. These clamps may be of any standard form and are here shown as comprising a hollow body 33a which is pivotally connected at 34 to a bracket 35 which in turn is rigid with the front wall 12b of the reservoir. Within the hollow body 33a is a collar or spring pressed downwardly and connected with a stem 36 which extends upwardly and is connected with the hand manipulated clamping dog 37. Each of these dogs presses downwardly on a flange 13d of the housing 13 to hold the parts firmly assembled.

Preferably, a transparent window 38 is provided in the front wall of the reservoir 12 and carrying an upper line marked "full" to indicate the level A previously indicated in FIG. 2, together with a line somewhat lower marked "add" so as to indicate to the operator that when the liquid level in the reservoir reaches the lower line, additional liquid should be added to the reservoir.

The operation of the device should now be clear. After the parts are placed together and clamped in assembly as shown in the drawings, the operator adds a suitable liquid through the opening 16 until the liquid level in the reservoir reaches the "full" line on the window 38. When these filters are used to remove dust from air, such a liquid is quite commonly oil. It will be understood that the filter panel frame 11 will be connected by suitable duct work to a device utilizing the air or gaseous stream which passes through the filter. Such use will include means for creating a suction whereby the air or gaseous stream is pulled through the filter herein disclosed.

The operation of the improved filter should now be clear. As the gaseous stream begins to flow through the inlet opening 14 under low-flow conditions, the spring 25 is strong enough to hold the baffle means 23 in the full line position of FIG. 2. Thus, substantially all of the air entering the inlet opening passes downwardly along the front side of the baffle means and then beneath the bar 27 and through the oil or liquid at the level A in the control trough 17. The gaseous stream carries some of the oil upwardly between the baffle means 23, 25, 26 on the front side, and the partition 19, 20, 21 on the rear side. Thus, the oil is carried toward the front face of the filter panel 10 and sprayed over substantially the entire front face thereof. This keeps the filter media coated with oil to more readily catch the dirt particles and any excess oil drains downwardly washing the filter media to the lower part of the panel where the oil drops into the same pool of liquid which extends from the reservoir 12 over into the lower part of the frame 11, 11A. As the volume and velocity of the entering gaseous stream increases, more and more of the oil above the trough 17 is entrained in the gaseous stream and carried up against the filter panel. The trough 17 thus limits the amount of oil placed in action. Once substantially all of the oil has been carried out of the trough 17, then additional oil flows in at a low rate through the plurality of openings 24. As the volume and velocity of the gaseous stream increases further, it becomes finally strong enough to push the baffle means 23 from the full line position of FIG. 2 toward the dot-dash position there shown and allowing some of the gaseous stream entering through the opening 14 to pass above the baffle and upwardly and rearwardly directly through the filter media. However, sufficient gaseous stream is flowing beneath the baffle means to keep sufficient spray against the front face of the panel to carry out the dust removal and the filter washing action previously described. At very high velocities and volume of stream flow, the baffle means reaches the dot-dash position of FIG. 2 resting against the stop pins 29. At this time, some of the oil is flicked off of the lip 21, forming the rear wall of the oil control trough 17, and other oil travels upwardly along the baffle 23 to be flicked off of the upper end thereof and carried up against the panel. At any time, upon sufficient decrease of air flow through the device, baffle means 23 will return to its full line position of FIG. 2. The dirt washed down out of the panel collects at the bottom of the reservoir 12. One or more drain plugs 39 are provided in the bottom of the reservoir to clean the sludge out.

What is claimed is:

1. A self-cleaning filter comprising a filtering medium having an inlet face for receiving a gaseous stream to be filtered, a liquid bath reservoir disposed upstream from said inlet face, means encasing and spaced from said inlet face and having a stream inlet portion thereof positioned to project into liquid in said liquid bath reservoir in such manner as to normally compel substantially all of the stream flow to pass through said liquid before impinging upon said inlet face, said means having baffle means upstream from said inlet face and normally forming a partition between the external atmosphere and the atmosphere adjacent the inlet face of said filtering medium, said baffle means having a portion thereof movably mounted with respect to the remainder of said encasing means to provide a by-pass stream inlet opening which by-passes said liquid bath reservoir permitting stream flow directly to said inlet face, said baffle means portion substantially closing said by-pass stream inlet opening at no flow and being movably responsive to a predetermined increase in stream flow velocity in such manner as to allow a substantial portion of the stream flow to by-pass said reservoir and to flow directly to said inlet face of said medium.

2. A filter as in claim 1, wherein said inlet face is generally vertically disposed, said baffle means is on the downstream side of said normal stream inlet opening and extends generally upwardly from substantially the level of liquid in said reservoir under no-flow conditions, and said baffle having upper and lower portions and a hinge connection between said portions permitting said upper portion to move away from said normal stream inlet opening under stream-flow conditions.

3. A fitter as in claim 2 including means biasing said upper portion toward closed position, said biasing means being sufficiently strong to hold said upper portion in position substantially closing said by-pass stream inlet opening under no-flow condition and said upper portion being movable to open position by gaseous stream flow through said filter greater than that at stand-by conditions.

4. A filter as in claim 3 wherein said means biasing said upper portion toward closed position is incorporated in said hinge connection.

5. A filter as in claim 1, wherein said normal stream inlet opening extends substantially across the lateral extent of said medium, said baffle means is on the downstream side of said normal stream inlet opening and extends generally upwardly from substantially the level of liquid in said reservoir under no-flow conditions, and said baffle means having upper and lower portions and a hinge connection between said portions permitting said upper portion to move away from said opening under stream-flow conditions.

6. A self cleaning filter comprising a filter media panel having a generally planar and generally vertical inlet face for an entering gaseous stream to be filtered, frame means about said panel limiting entering stream flow substantially to said inlet face, a liquid bath reservoir in front of and adjacent the lower portion of said panel and extending substantially across the lateral width of said panel, a housing enclosing the space upstream of said panel and over said reservoir, means defining a gaseous stream inlet opening through said housing extending substantially across the lateral width of said panel, said inlet opening being spaced upstream from said panel and extending from just above said reservoir upwardly substantially half the vertical height of said panel, substantially imperforate baffle means in said housing and extending laterally substantially across the width of said panel and extending vertically substantially from a normal level of liquid in said reservoir at no-flow condition upwardly to the top of said inlet opening means, means biasing said baffle means substantially into sealing engagement with the upper edge of said inlet opening means at no-flow condition, the lower portion of said baffle means being spaced from said inlet opening means, and said biasing means holding said baffle means substantially in said sealing engagement only from no-flow condition to between one-tenth and four-tenths of full flow condition, and above said latter condition the gaseous stream flow overcomes said biasing means and holds said baffle means out of sealing engagement with the upper edge of said inlet opening means, whereby at lower gaseous stream flows substantially all incoming gas is directed through said bath in said reservoir and at higher stream flows some of said gas passes directly from said inlet opening means to said panel.

7. The combination of claim 6 wherein said biasing means is a spring hinge operatively connected with said baffle means.

8. The combination of claim 6 including an oil control trough extending from a zone below said baffle means and below the normal level of liquid in said reservoir at no-flow condition and thence inclined upwardly toward said panel.

9. The combination of claim 8 wherein said trough terminates in a lip near said panel, said lip having a flange inclined away from said panel and then back towards said panel.

10. The combination of claim 6 including a substantially imperforate oil control trough concave upwardly below said baffle means and extending from a zone upstream from said baffle means to a zone downstream therefrom, at least the central portion of said trough extending below the normal level of liquid in said reservoir at no-flow condition, and there being a small number of liquid inlet openings through the bottom of said trough.

11. The combination of claim 10 including a manometer skirt substantially completely enclosing the space in said reservoir below said trough, said skirt being open at the bottom only, and said skirt terminating a short distance above the bottom of said reservoir.

12. The combination of claim 11 wherein said housing and said baffle means and said trough and said skirt are assembled in a unitary construction, and detachable means for securing said unitary construction to said panel and said reservoir.

13. The combination of claim 12 wherein said panel and said reservoir are rigidly connected together.

14. The combination of claim 1 wherein said medium extends to a zone below the level of the liquid bath in said reservoir.

15. A self-cleaning filter for gaseous streams comprising a filtering medium, a housing surrounding said medium and having a gaseous inlet and a gaseous outlet, said housing compelling all of a gaseous stream to be filtered to pass in a stream path from said inlet through said medium to said outlet, a liquid bath reservoir contiguous said stream path upstream from said medium and closely adjacent thereto, baffle means downstream from said inlet projecting into said liquid bath reservoir and blocking said stream path and compelling substantially all stream flow from said inlet through liquid in said reservoir at minimum stream velocity whereby reservoir liquid is carried by said stream into said medium, and by-pass means associated with said baffle means by-passing said reservoir and responsive to a higher stream velocity for providing another path for partial stream flow directly from said inlet to said medium whereby said partial stream flow picks up no liquid from said reservoir.

References Cited in the file of this patent
UNITED STATES PATENTS

| | | |
|---|---|---|
| 1,960,260 | Acton | May 29, 1934 |
| 2,684,232 | Caldwell | July 20, 1954 |